(No Model.)

O. FINNIGAN.
CARRIAGE WHEEL.

No. 514,708. Patented Feb. 13, 1894.

WITNESSES: INVENTOR:
Owen Finnigan,
By his Atty,

UNITED STATES PATENT OFFICE.

OWEN FINNIGAN, OF PHILADELPHIA, PENNSYLVANIA.

CARRIAGE-WHEEL.

SPECIFICATION forming part of Letters Patent No. 514,708, dated February 13, 1894.

Application filed March 2, 1893. Serial No. 464,295. (No model.)

*To all whom it may concern:*

Be it known that I, OWEN FINNIGAN, of the city and county of Philadelphia and State of Pennsylvania, have invented an Improvement in Carriage-Wheels, of which the following is a specification.

My invention has reference to carriage wheels, and consists of certain improvements which are fully set forth in the following specification and shown in the accompanying drawings which form a part thereof.

The object of my invention is to construct a vehicle wheel especially adapted to light buggies or other carriages which shall have great elasticity at the periphery to permit easy and smooth running.

In carrying out my invention I provide the felly of the wheel with a rubber tire of peculiar cross section hereinafter more fully described, and secure the same to the felly, if desired, by either or both cementing and metallic clamps. The felly of the wheel may be provided with circumferential grooves upon its outer edges into which the rubber of the tire fits to insure it against lateral displacement. The felly may also be ironed with a light metallic tire for strength, which tire is arranged between the outer circumference of the felly and the inner circumference of the rubber tire.

Figure 1:
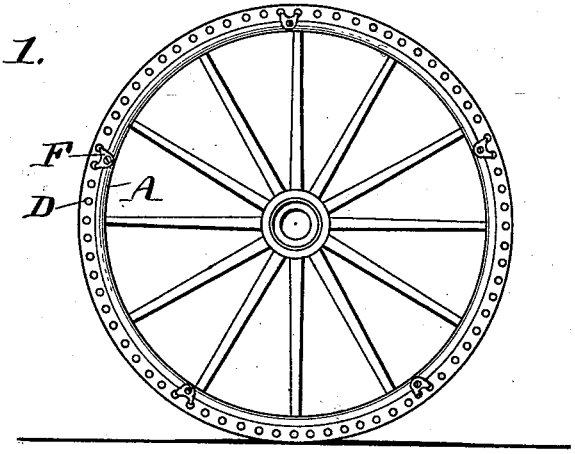
Figure 2:
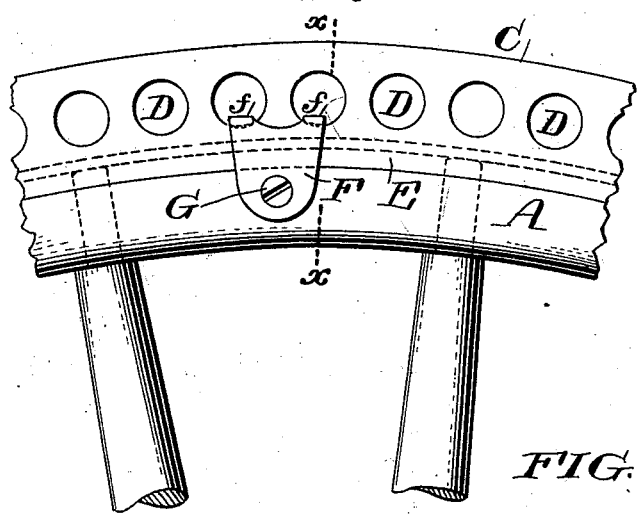
Figure 3:
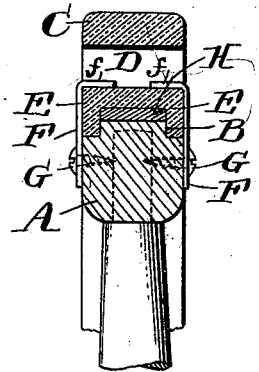
Figure 4:
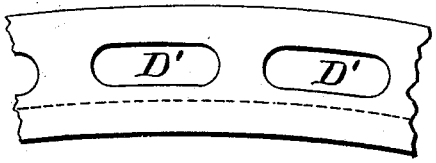

Referring to the drawings: Figure 1 is an elvation of a carriage wheel embodying my invention. Fig. 2 is an elevation of a full size portion of my improved wheel. Fig. 3 is a cross section of same on line *x—x;* and Fig. 4 is a side elevation of my improved rubber tire in a modified form.

A is the felly of the wheel and may be made of wood in the usual manner and fitted to the spokes as is customary. The outer circumferential edges of the felly are grooved as at B.

C is a rubber tire, and is made preferably as shown in Figs. 2 and 3. The body of the rubber is peforated as at D, D, so as to make it very flexible and at the same time have sufficient rigidity to properly support the weight of the vehicle and its contents. The tire C is provided with side projections or flanges E which extend down into the circumferential grooves or recesses B of the felly as clearly indicated in Fig. 3, thus fitting over the felly and yet being of substantially the same width. This imparts a fine appearance and at the same time prevents the tire being readily displaced from the felly.

It is evident that the felly of the wheel may be provided with a light metallic hoop or tire H to impart strength to it. In case the said hoop is employed it would be of a width equal to the width of the central part of the felly at its greatest diameter. The rubber tire C rests directly upon this iron band at the middle and has its flanges E projecting down so as to fit into the annular grooves B on the sides of the felly. This rubber, in practice, is made of somewhat smaller diameter than that of the wheel and is stretched to fit the wheel tightly. It is preferably cemented in place with suitable rubber cement.

In addition or as a substitute to the rubber cement I prefer to employ metallic clamping plates F having inwardly projecting parts *f* which fit into the holes or recesses D of the tire and are secured to the felly A by means of screws G. These clamps may be of stamped sheet metal and placed on each side of the felly of the wheel.

It is immaterial to my invention whether the apertures B be circular or of any other shape, though I prefer to make them circular as shown in Figs. 2 and 3 on account of cheapness of manufacture and more uniform distribution of the rubber. If desired, two of the said apertures D, D may be formed into the one oblong aperture as indicated at D' in Fig. 4; and it is also evident that the rim of the wheel may be modified without departing from the spirit of the invention.

In practice it is preferable that the thickness of the rubber from the outside of the rubber tire C to the wall of the aperture B shall be thicker than the rubber interposed between said aperture and the felly or metallic tire H as it is subjected to greater wear and tear. This difference in thickness is clearly shown in the various figures. A tire of this character will essentially consist of two circular annular bands of rubber united at intervals by radial supports of elastic material giving elasticity to the entire structure and at the same time having sufficient firmness to properly support the weight of the vehicle.

What I claim as new, and desire to secure by Letters Patent, is—

1. In a vehicle wheel, the combination of a wooden felly, with a rubber tire fitted to the periphery of the felly of the same width as the felly and provided with a series of transverse apertures extending entirely through the rubber and forming two circular bands of rubber united integrally at close intervals by radiating walls of rubber, and clamping plates secured to the wooden felly and having laterally projecting parts which extend into the apertures of the tire to hold it in place upon the felly.

2. In a vehicle wheel, the combination of a wooden felly, with a rubber tire fitted to the periphery of the felly of the same width as the felly and provided with a series of transverse apertures extending entirely through the rubber and forming two circular bands of rubber united integrally at close intervals by radiating walls of rubber, and a metallic hoop or tire encircling the felly interposed between the felly and rubber tire and of less width than the rubber tire.

3. In a vehicle wheel, the combination of a wooden felly having its outer edges recessed or grooved, in combination with a rubber tire having transverse perforations and inwardly extending flanges adapted to fit down into the grooves or recesses on the felly.

4. In a vehicle wheel, the combination of a wooden felly having its outer edges recessed or grooved, in combination with a rubber tire having transverse perforations and inwardly extending flanges adapted to fit down into the grooves or recesses on the felly, and a metallic band or tire of less width than the felly and interposed between the flanges of the tire.

5. In a vehicle wheel, the combination of a wooden felly having its outer edges recessed or grooved, in combination with a rubber tire having transverse perforations and inwardly extending flanges adapted to fit down into the grooves or recesses on the felly, a metallic band or tire of less width than the felly and interposed between the flanges of the tire, and metallic clamps secured to the felly and having lateral projections extending into apertures of the rubber tire to hold it in place.

6. In a vehicle wheel, the combination of a felly having its outer edges recessed or grooved, in combination with a transversely perforated rubber tire having a width substantially equal to that of the felly and provided with flanges fitting down into the grooves or recesses in the felly wheel.

7. In a vehicle wheel, the combination of a felly having its outer edges recessed or grooved, in combination with a rubber tire having a width substantially equal to that of the felly and provided with flanges fitting down into the grooves or recessed in the felly wheel, and a metallic hoop or tire interposed between the rubber tire and the felly and also between the flanges of the rubber tire.

In testimony of which invention I have hereunto set my hand.

OWEN FINNIGAN.

Witnesses:
ERNEST HOWARD HUNTER,
R. M. HUNTER.